United States Patent [19]

Roiko et al.

[11] 4,415,694

[45] Nov. 15, 1983

[54] CONTACT ENHANCING COMPOSITION

[75] Inventors: Russell A. Roiko, Rogers; Richard J. Pokorny, Woodbury, both of Minn.

[73] Assignee: Minnesota Mining and Manufacturing Company, St. Paul, Minn.

[21] Appl. No.: 379,340

[22] Filed: May 18, 1982

Related U.S. Application Data

[63] Continuation-in-part of Ser. No. 283,286, Jul. 14, 1981, abandoned.

[51] Int. Cl.$^3$ ............................................... C08K 5/20
[52] U.S. Cl. ................................ 524/200; 524/207; 524/208; 525/199; 525/200; 525/207
[58] Field of Search ................. 524/200, 207, 208; 525/199; 260/DIG. 24

[56] References Cited

U.S. PATENT DOCUMENTS

| | | | |
|---|---|---|---|
| 3,398,182 | 8/1968 | Guenthner et al. | 260/455 |
| 3,564,059 | 2/1971 | Sianesi | 524/208 |
| 3,896,251 | 7/1975 | Landucci | 428/290 |
| 4,029,843 | 6/1977 | Shah et al. | 428/352 |
| 4,178,059 | 12/1979 | Bubar et al. | 339/115 R |
| 4,215,205 | 7/1980 | Landucci | 525/331 |
| 4,329,272 | 5/1982 | Dufour | 525/207 |

OTHER PUBLICATIONS

Freitag, W. O., "Lubricants for Separable Connectors," Proceedings of the Twenty-Second Annual Holm Seminar on Electrical Contacts, Institute of Technology, I1, 1976.

*Primary Examiner*—Paul R. Michl
*Attorney, Agent, or Firm*—Donald M. Sell; James A. Smith; Lorraine R. Sherman

[57] ABSTRACT

A composition for coating on low pressure sliding connections to enhance electrical contact comprises an admixture of an anhydride copolymer; a flexibilizing copolymer; a hydrophobic, soluble, compatible fluoroaliphatic radical-containing composition; an antioxidant; optionally a mercaptan; and a suitable solvent system. Articles coated with the contact enhancing composition are disclosed.

25 Claims, No Drawings

CONTACT ENHANCING COMPOSITION

This is a continuation-in-part application of U.S. Ser. No. 283,286, filed July 14, 1981, now abandoned.

TECHNICAL FIELD

This invention relates to an electrical contact enhancing composition for coating onto low pressure sliding or slidable connections, and more specifically onto pin-and-socket type connectors. In another aspect, it relates to articles coated with these electrical contact enhancing composition of the present invention.

BACKGROUND ART

Electrical connectors subject to plug and unplug motion often suffer from wear, such as fretting, and increased contact resistance due to atmospherically induced corrosion of the contact caused by humidity, pollutants, and oxidation. In the prior art, microcrystalline waxes are known as contact enhancing compositions. In addition, antioxidant lubricating fluids have been used on electrical connectors to decrease this wear and the corrosion to which they are subject. W. O. Freitag, "Lubricants for Separable Connectors," Proceedings of the Twenty-Second Annual Holm Seminar on Electrical Contacts, Institute of Technology, Il, 1976, discusses a wide variety of natural and synthetic materials such as polyphenyl esters, natural and synthetic hydrocarbons, esters, polyglycols, fluorinated materials, and silicones that are available.

Since most fluid lubricants are insulators, their use can actually serve to minimize or entirely prevent the desired metallic contact, and contact resistance between sliding surfaces may be very high.

In an effort to overcome the deficiencies of lubricants, other materials have been utilized. For example, U.S. Pat. No. 4,178,059 teaches a thin self-adherent layer of soft protective plastic having lubricative properties, such as polytetrafluoroethylene, coated on the screw base of an electric lamp.

Gold plating of contacts or contact points is practiced in the art due to the outstanding electrical properties of gold and its known inertness to corrosion. However, the high cost of this metal has made it desirable to eliminate gold plates contacts.

There remains a need in the art for electrical contact enhancing compositions which can provide a high degree of environmental protection to contacts made of metals such as copper alloys coated with metals such as tin, tin/lead, and silver, and which can provide good electrical performance.

U.S. Pat. No. 4,029,843 discloses a polyanhydride resin prepared by reaction of an alpha-olefin, a dicarboxylic anhydride such as maleic anhydride, and water or an amine or an alcohol, the polymeric resin being useful as a release agent.

DISCLOSURE OF INVENTION

Briefly, the present invention provides an electrical contact enhancing composition for coating on low pressure sliding connections, comprising an admixture of an anhydride copolymer, a flexibilizing copolymer, a hydrophobic, soluble, compatible fluoroaliphatic radical-containing composition, an antioxidant, optionally a mercaptan, and a suitable solvent system.

The invention provides a soft, deformable coating composition to form a skin on a connecting block (electrical receptor) made of an insulating material, which can be any thermoplastic, such as polycarbonate, polypropylene, polyethylene, polyurethane, polyphenyl oxide, or nylon; any thermoset plastic such as phenolic, urea, or melamine formaldehydes; or ceramic, such as procelain; and constants in it made of metals such as copper alloys, tin, silver, gold, steels or stainless steels. The connecting block with its contacts or receptors, and a set of pins made of metals such as copper alloys or stainless steels forms a mating pair of electrical contacts. When plugged in, each pin displaces the deformable coating composition in at least one area of the receptor so as to provide direct metal to metal contact between the pin and recrptor, thereby providing good electrical conductivity, while the composition seals the contact area from the environment. Upon pin removal, due to the spring load type of contact used in the art, wiping action between pin and receptacle and composition results, and the composition is thereby reapplied to the exposed metal surfaces. Upon re-insertion of the pin in the receptacle, the same or a new metal surface on both pin and receptor is exposed. Generally, the area of exposed metal becomes larger as the plug-unplug process continues. Continuous wiping action results in the retardation of pin oxidation and weatherability of the terminal block is thereby provided. The coating has sufficient resiliency and adherence so that it seals firmly to the metals and plastics or ceramics used in the receptacle block and pins.

Desirable properties of a contact enhancing composition includes the following: lubricity to reduce friction and wear, non-volatility to prolong times between re-lubrication, fretting protection by shutting out the atmosphere during motion of parts, low creep to avoid contamination elsewhere and to avoid the need for re-lubrication, oxidative stability so as not to form insulating resins in situ, and compatibility so as not to interact with metallic or nonmetallic materials around the contact.

Related compositions useful as wire coating materials are disclosed in commonly assigned copending patent application, Ser. No. 283,292, filed the same date as the parent of this application. It is surprising that a resinous composition having insulative properties has utility for electrical contact enhancement.

DETAILED DESCRIPTION

The electrical contact enhancing composition of the present invention comprises an admixture of:

an effective amount, preferably 8 to 75 weight percent of the dried composition, and most preferably 10 to 67 weight percent, of an anhydride copolymer to provide adherence to metals, plastics, and ceramics, an effective amount, preferably 8 to 75 weight percent of the dried composition, and most preferably 10 to 57 weight percent, of a flexibilizing polymer to provide deforming properties to the composition, an effective amount, preferably 5 to 75 weight percent of the dried composition, and most preferably 7 to 68 weight percent, of a hydrophobic, soluble, compatible fluoroaliphatic radical-containing compound or polymer, to provide water-repellancy and lubricating properties to the composition, 0 to 7 weight percent of the dried composition, preferably 0.05 to 1.0 weight percent, of a mercaptan compound to improve insulative properties between neighboring contacts, and an effective amount, preferably 1.0 to 20 weight percent of the dried composition, and most preferably 1.5 to 18 weight percent, of an antioxidant to prevent oxidation of the metal surfaces.

In the present application:

"compatible" means a clear to slightly translucent non-separating polymer mixture; and "deformable" means capable of changing in shape so as to expose contact surfaces.

For coating applications, the composition is dissolved at a level of 4 to 30 percent by weight of the total solution, preferably 10 to 20 percent by weight of the total solution, in a nonflammable solvent system comprising a mixture of $C_6$ to $C_9$ aliphatic hydrocarbons, lower molecular weight $C_1$ to $C_4$ alcohols, and trichlotrifluoroethane.

The anhydride copolymer component is an anhydride which is an alkyl-, phenyl- or phenylalkyl-substituted or unsubstituted cyclic anhydride in which each alkyl group can contain 1 to 6 carbon atoms, and the cyclic group can contain 4 to 15 carbon atoms, such as maleic or itaconic anhydride copolymerized with a $C_{10}$ to $C_{24}$ aliphatic hydrocarbon, and preferably the copolymer is maleic anhydride octadecene copolymer (PA-18, Gulf Oil Chemicals Co.), maleic anhydride decene copolymer (PA-10, Gulf Oil Chemicals Co.), or maleic anhydride tetradecene copolymer is present in an amount sufficient to provide adhesion to a number of substrates, for example, polyethylene, polycarbonate, and metals such as copper.

Due to the brittle nature of the anhydride copolymer as well as its hydrolysis in the presence of water which leads to low insulation resistance and corrosion of metals, and due to its insufficient adhesion to substrates, it has been found that a flexibilizing polymer such as polyisobutylene, styrene olefin styrene block polymer, or ethylene copolymerized with vinyl acetate, acrylate esters, methacrylate esters, or alpha-olefins, provides improvement. The flexibilizing polymer is a rubbery, compatible, adherent material present in an amount sufficient to provide a soft, flexible coating. Desirably it is soluble in the solvent system. Preferably it is an ethylene vinylacetate copolymer with 33% vinyl acetate (Elvax 150®, E. I. DuPont de Nemours Corp.) or an ethylene vinylacetate copolymer with 28% vinyl acetate (Elvax 240® or Elvax 250®, E. I. Dupont de Nemours Corp).

The composition of the present invention also includes a hydrophobic, soluble, compatible fluoroaliphatic radical-containing composition, i.e., compounds or polymers, or mixtures thereof, to provide hydrophobicity to the mixture so as to result in a water repellant product. By fluoroaliphatic radical is meant a monovalent, fluorinated, aliphatic, preferably saturated, organic radical having an average of at least 5 to 14 carbon atoms. The skeletal chain or the radical can be straight, branched, or, if sufficiently large, cyclic, and can be interrupted by divalent oxygen atoms or trivalent nitrogen atoms bonded only to carbon atoms. Preferably, it is fully fluorinated, but hydrogen or chlorine atoms can be present as substituents on the skeletal chain, provided that not more than one atom of either hydrogen or chlorine is present for every wo carbon atoms in the skeletal chain, and the radical contains at least a terminal perfluoromethyl group. Preferably, the radical has about 6 to 10 carbon atoms. The fluoroaliphatic radical-containing compositions of this invention can contain radicals which are the same as, or different from, one another. The fluoroaliphatic radical-containing compositions include vinyl polymers such as those disclosed in U.S. Pat. No. 3,896,251. Particularly useful are acrylate polymers with urethane-containing side chains, blends of fluoroaliphatic radicals containing acrylate polymers and fluorocarbon compounds or adducts such as described in U.S. Pat. No. 4,215,205. Compounds which are useful include adducts of fluoroaliphatic radical containing alcohols and organic isocyanates such as the urethane adduct of two moles of N-ethylperfluoroalkyl-sufonamidoethanol and one mole toluene diisocyanate, which adduct is hereinafter referred to as Compound I (3M). A particularly useful polymer is 57:28:15 N-methylperfluorooctylsulfonamidoethyl methacrylate : N-ethylperfluorooctylsulfonamidoethylalcohol [toluene-2,4-diisocyanate] hydroxypropyl methacrylate:butyl acrylate, hereinafter referred to as Compound II (3M), and a polymer adduct mixture, hereinafter referred to as Compound III (3M) and contains 31.5 parts by weight of methyl N-methylperfluorooctyl-sulfonamidoethylacrylate 31.5 parts by weight of butyl N-methylperfluorooctylsulfonamido methacrylate 18 parts by weight of dimethacrylate of 2000 molecular weight tetra-methylene oxide diol (Polymeg 2000, Quaker Oats Co.)

9 parts by weight of butyl acrylate, and 10 parts by weight of N-ethylperfluorooctylsulfonamido ethanol toluene diisocyanate adduct which has been converted to carbodiimide.

Other useful fluoroaliphatic vinyl containing polymers are described in U.S. Pat. Nos. 2,803,615, 3,462,296, 3,950,298, 3,574,791 (ex. 17), and U.S. Pat. No. 3,787,351.

An effective amount, i.e., up to 7 weight percent of the dried composition, and preferably 0.05 to 1 percent, of a soluble, compatible silane mercaptan having 4 to 17 carbon atoms such as (1) the class of omega-trialkoxysilylalkylmercaptans, wherein the alkoxy group has up to 3 carbon atoms ($C_1$ is preferred) and the alkyl group has 2 to 8 carbon atoms, exemplified by gamma-mercaptopropyltrimethoxysilane (A-189, Union Carbide), or (2) an alkyl or alkoxy mercaptan of 4 to 24 carbon atoms, exemplified by octadecene mercaptan, in the composition inhibits corrosion of the metal.

A sufficient amount of an antioxidant is included in the formulation to prevent oxidation of the exposed metal surfaces. Suitable antioxidants include a hindered phenol such as tetrakis[methylene 3-(3',5'-di-tert-butyl-4'-hydroxyphenyl)propionate]methane (Irganox 1010®, Ciba-Geigy Corp.), thiodiethylene bis-(3,5-di-tert-butyl-4-hydroxy)hydrocinnamate (Irganox 1035®, Ciba-Geigy Corp.), or octadecyl-3-(3',5'-di-tert-butyl-4'-hydroxyphenyl)propionate (Irganox 1076®, Ciba-Geigy Corp.), a copper ion scavenger and antioxidant such as MD1024 (Ciba-Geigy Corp.), or a compound such as distearyl thiodipropionate (Cyanox STDP®, American Cyanamid Polymer and Chem. Dept.).

For ease of application, the composition is in solution form. Since polycarbonate is widely used in the communication field, and since polycarbonate is susceptible to being soluble in certain solvents, solvents useful in the present invention solvate the anhydride and flexibilizing polymers, but not the polycarbonate. Aliphatic hydrocarbons, such as heptane or hexane, comprise 5 to 35 percent by weight of the solvent system, and lower molecular weight alcohols such as isopropyl alcohol comprise 0.5 to 25 percent, and trichlorotrifluoroethane (Freon TF ®, E. I. Dupont de Nemours Corp.) comprises 30 to 90 percent, preferably 50 to 80 percent, by weight of the solvent system. The solvent mixture provides the desired solubility for the components of the mixture and not to polycarbonate, and also provides a suitable evaporation rate after application. Freon TF provides non-flammability to the coating composition. This property is desirable due to the frequent application of the composition in enclosed areas.

The composition of the present invention, which is insulative between neighboring contacts but deformable under contact spring pressure to allow metal to metal contact, is applied in a thickness in the range of 25 to 250 microns, preferably 50 to 180 microns, and may be sprayed or brushed onto the connecting block, but preferably it is dipped. The composition dries to a tack-free state at ambient conditions in 10 to 40 minutes. The evaporation rate, desirably, is slow enough so as not to clog a spray head, and fast enough so as to result in a reasonably rapid drying speed for the applied composition.

The electrical contact enhancing composition will form a smooth, deformable, resilient, adherent film on low pressure sliding electrical connections. It is useful when replacing gold plate contacts with copper alloys coated with metals such as tin, tin-lead, and silver or it allows the use of very thin gold plate.

Objects and advantages of this invention are further illustrated by the following examples, but the particular materials and amounts thereof recited in these examples, as well as other conditions and details, should not be construed to unduly limit this invention.

Thirty-one sample compositions were prepared for testing. The formulations of these samples are listed in Table I.

TABLE I

| SAMPLE NO. | AOX$^{(I)}$ | P** | RUBBER$^{(II)}$ | P** | HEPTANE | IPA$^{(III)}$ | AC$^{(IV)}$ | P** | M$^{(V)}$ | P** | FR$^{(VI)}$ | FC$^{(VII)}$ | P** |
|---|---|---|---|---|---|---|---|---|---|---|---|---|---|
| 1 | 0 | 0 | 5.1 | 29.6 | 16 | 8 | 9.0 | 52.2 | | | 54.1 | 7.8 | 18.1 |
| 2 | 0.9 | 5.0 | 5.1 | 28.1 | 16 | 8 | 9.0 | 49.7 | | | 53.2 | 7.8 | 17.2 |
| 3 | .3 | 4.1 | 7.0 | 95.9 | 16 | 8 | 0 | | | | 68.7 | 0 | |
| 4 | .3 | 2.1 | 5.1 | 35.4 | 16 | 8 | 9 | 62.5 | | | 61.6 | 0 | |
| 5 | .3 | 3.5 | 5.1 | 59.8 | 16 | 8 | 0 | | | | 62.8 | 7.8 | 36.6 |
| 6 | .3 | 1.7 | 5.1(g) | 29.1 | 21 | 3 | 9 | 51.4 | | | 53.8 | 7.8 | 17.8 |
| 7 | .3 | 1.7 | 5.1(f) | 29.1 | 16 | 8 | 9 | 51.4 | | | 53.8 | 7.8 | 17.8 |
| 8 | .3 | 3.1 | 5.1 | 53.6 | 16 | 8 | 0 | | 1.0 | 10.5 | 61.8 | 7.8 | 32.8 |
| 9 | 1.33 | 6.8 | 5.9 | 30.0 | 20 | 13.3 | 10.5 | 53.5 | .1 | .5 | 44.3 | 4.5 | 9.2 |
| 10 | .67 .67(c) | 3.4 3.4 | 5.93 | 30.3 | 20 | 13.3 | 10.5 | 53.6 | | | 44.3 | 4.53 | 9.3 |
| 11 | .67 .67(d) | 3.4 3.4 | 5.93 | 30.3 | 20 | 13.3 | 10.5 | 53.6 | | | 44.3 | 4.53 | 9.3 |
| 12 | 2.67 | 12.8 | 5.93 | 28.3 | 20 | 13.3 | 10.5 | 50.2 | | | 44.3 | 4.53 | 8.7 |
| 13 | 1.33(a) | 6.8 | 5.93 | 30.3 | 20 | 13.3 | 10.5 | 53.6 | | | 44.3 | 4.53 | 9.3 |
| 14 | 1.33(b) | 6.8 | 5.93 | 30.3 | 20 | 13.3 | 10.5 | 53.6 | | | 44.3 | 4.53 | 9.3 |
| 15 | .67 .67(e) | 3.4 3.4 | 5.93 | 30.3 | 20 | 13.3 | 10.5 | 53.6 | | | 44.3 | 4.53 | 9.3 |
| 16 | 1.33 | 6.5 | 5.93 | 28.8 | 20 | 13.3 | 10.5 | 51.0 | 1.0 | 4.9 | 44.3 | 4.53 | 8.8 |
| 17 | 1.33 | 9.4 | 4.17(f) | 29.4 | 25 | 10 | 7.4 | 52.2 | | | 49.0 | 3.17 | 8.9 |
| 18 | .13 | 2.2 | 1.7 | 28.9 | 8 | 4 | 3.0 | 51.1 | | | 80.6 | 2.6 | 17.7 |
| 19 | 1.33 | 6.8 | 5.9 | 30.0 | 20 | 13.3 | 10.5 | 53.5 | .1 | .5 | 44.3 | 4.5 | 9.2 |
| 20 | 1.3(b) | 6.8 | 5.9 | 30.2 | 20 | 13.3 | 10.5(i) | 53.8 | | | 44.3 | 4.53 | 9.2 |
| 21 | 1.3(b) | 6.8 | 5.9 | 30.2 | 20 | 13.3 | 10.5 | 53.8 | | | 44.3 | 4.53(j) | 9.2 |
| 22 | 2(b) | 7.8 | 10.5 | 40.8 | 35 | 15 | 10.5 | 40.8 | | | 70.2 | 6.8 | 10.6 |
| 23 | .3 | 1.5 | 5.1(g) | 25.7 | 21 | 3 | 9 | 45.4 | | | 53.8 | 7.8 | 27.4 |
| 24 | .7(b) | 3.2 | 4.2 | 19.4 | 15 | 10 | 2.1 | 9.7 | | | 31.3 | 36.7 | 67.7 |
| 25 | .83(b) | 2.5 | 3.2 | 9.7 | 20 | 10 | 16 | 48.8 | | | 18 | 32 | 39.0 |
| 26 | 1(b) | 5 | 12 | 57 | 36.7 | 13.3 | 4 | 19 | | | 23 | 20 | 19 |
| 27 | 1.33(b) | 6.8 | 5.93 | 30.2 | 20 | 13.3 | 10.5 | 53.8 | | | 44.3 | 4.53 | 9.2 |
| 28 | 2(b) | 6.8 | 8.9 | 30.2 | 20 | 13.3 | 15.8 | 53.8 | | | 33.2 | 6.8 | 9.2 |
| 29 | 2(b) | 7.1 | 8.5(f) | 30.3 | 45 | 5 | 15 | 53.4 | | | 68 | 6.5 | 9.2 |
| 30 | 2(b) | 17.8 | 3(h) | 26.7 | 45 | 5 | 5.3 | 47.3 | | | 87.4 | 2.3 | 8.2 |
| 31 | 2(b) | 5.2 | 8 | 21 | 35 | 15 | 25.4 | 66.6 | | | 57.8 | 6.8 | 7.1 |

*Numbers are in grams, except in the percent (P) columns, where percents refer to weight percent of the substance, in the dried composition given in the column immediately preceding
**Percent (weight percent of dried composition)
$^{(I)}$AOX = Antioxidant Irganox 1010, except for:
(a)Irganox 1035, hindered phenol antioxidant (Ciba-Geigy Corp.)
(b)Irganox 1076, hindered phenol antioxidant (Ciba-Geigy Corp.)
(c)substituted benzotriazole (Tinuvin 328 ®, Ciba-Geigy Corp.)
(d)copper ion scavenger and antioxidant (MD 1024, Ciba-Geigy Corp.)
(e)distearyl thiodipropionate (Cyanox STDP ®, American Cyanamid Polymer and Chem. Dept.)
$^{(II)}$Elvax 150, ethylene-vinylacetate copolymer (E. I. DuPont de Nemours Corp.), except for:
(f)Elvax 240, ethylene-vinylacetate copolymer (E. I. DuPont Corp.)
(g)Kraton G 1650 ®, styrene ethylene butylene styrene block copolymer rubber (Shell Chemical Co.)
(h)DPDA 6182 ethylene ethyl acrylate (Union Carbide Corp.)
$^{(III)}$IPA = isopropyl alcohol
$^{(IV)}$AC = anhydride copolymer, PA-18 maleic anhydride-octadecene copolymer (Gulf Oil Chemicals Co.), except for:
(i)PA-10, maleic anhydride-decene copolymer (Gulf Oil Chemicals Co.)
$^{(V)}$M = mercaptan, gamma-mercaptopropyltrimethoxysilane (A-189, Union Carbide Corp.)
$^{(VI)}$FR = trichlorotrifluoroethane (Freon TF ®, E. I. DuPont de Nemours Corp.)
$^{(VII)}$FC = fluorocarbon polymer (compound II, see above), except for:
(j)fluorocarbon polymer (compound I, see above)

A satisfactory contact enhancing composition provides protection against insulation resistance (IR) degradation in both humid and corrosive (salt fog) environments. It also provides maintenance of a low connection resistance at contant interfaces. Many samples gave satisfactory results in any one test, but a useful contact enhancing composition provided good results in all tests. All evaluations utilized the industry standard 5-pin #3AB protectors and 10-pair receptacle blocks no. R713-1 (Reliable Electric Co., Franklin Park, IL). The receptacles were coated with the sample compositions of Table I to provide a dried film 25 to 75 microns thick. In each test, samples were uniformly coated.

EXAMPLE 1

The following method was used to prepare sample compositions 1–31 of TABLE I. In a suitable vessel the indicated amounts of antioxidant, flexibilizing polymer, aliphatic hydrocarbon, and low molecular weight alcohol were heated and stirred to 55° C. When the flexibilizing polymer was dissolved, the anhydride copolymer was added. This was stirred until it was dissolved. Then the temperature of the mixture was adjusted to 35° C. and Freon TF was added. The temperature was maintained at 35° C. and the mixture was stirred for 10 minutes. Next, the indicated amount of fluorocarbon compound and the mercaptan compound were added and mixed for 30 minutes at 35° C. The solutions were allowed to cool for 24 hours and then testing was done.

Insulation resistance, measured in ohms, was used to define electrical circuit isolation. Only the median value in each set is reported. The normal standard is in the range of $10^6$ to $10^8$ ohms minimum.

A high temperature and high humidity test, run essentially as described in AT&T Network Department Product Evaluation Report #149, Issue 2, ¶ 2.0107, was conducted under high temperature and high humidity conditions (52° C. and 90–95 percent relative humidity). Humidity absorption and subsequent hydrolysis of an insulating composition resulted in insulation resistance degradation. Data collected initially and after 4 hours, 1 day, 2 days, and 3 days is shown in Table II for samples 1–9, 18, 28, and 29 from Table I and a control sample which was uncoated.

TABLE II
HIGH TEMPERATURE AND HIGH HUMIDITY TEST DATA
IR DATA IN OHMS

| Sample No. | Initial | 4 hrs. | Day 1 | Day 2 | Day 3 |
|---|---|---|---|---|---|
| 1 | $14 \times 10^{10}$ | $48 \times 10^5$ | $18 \times 10^5$ | $14 \times 10^7$ | $39 \times 10^6$ |
| 2 | $17 \times 10^{10}$ | $42 \times 10^5$ | $14 \times 10^5$ | $11 \times 10^7$ | $31 \times 10^6$ |
| 3 | $13 \times 10^{10}$ | $36 \times 10^8$ | $28 \times 10^8$ | $59 \times 10^8$ | $57 \times 10^8$ |
| 4 | $21 \times 10^{10}$ | $44 \times 10^5$ | $13 \times 10^5$ | $50 \times 10^6$ | $30 \times 10^6$ |
| 5 | $25 \times 10^{10}$ | $14 \times 10^9$ | $10 \times 10^9$ | $13 \times 10^9$ | $13 \times 10^9$ |
| 6 | $17 \times 10^{10}$ | $82 \times 10^5$ | $16 \times 10^6$ | $13 \times 10^7$ | $12 \times 10^7$ |
| 7 | $15 \times 10^{10}$ | $56 \times 10^5$ | $12 \times 10^6$ | $15 \times 10^7$ | $10 \times 10^7$ |
| 8 | $39 \times 10^{10}$ | $37 \times 10^9$ | $21 \times 10^9$ | $31 \times 10^9$ | $34 \times 10^9$ |
| 9 | $11 \times 10^{10}$ | $17 \times 10^9$ | $8 \times 10^9$ | $4 \times 10^9$ | $10 \times 10^9$ |
| 18 | $21 \times 10^9$ | | $36 \times 10^9$ | $30 \times 10^9$ | $29 \times 10^9$ |
| 28 | $25 \times 10^9$ | | $23 \times 10^8$ | $97 \times 10^6$ | $70 \times 10^6$ |
| 29 | $21 \times 10^9$ | | $75 \times 10^8$ | $63 \times 10^8$ | $61 \times 10^8$ |
| control | $19 \times 10^{10}$ | $67 \times 10^8$ | $48 \times 10^8$ | $95 \times 10^8$ | $81 \times 10^8$ |

The results of Table II show that in the high temperature and high humidity test a beneficial effect on insulation resistance was achieved when mercaptan was included in the composition (sample Nos. 8 and 9). Good IR results were obtained with samples 3, 5, 8, 9, 18, 28, 29 and the control.

EXAMPLE 2

A second test for insulation resistance was conducted in a salt fog atmosphere, essentially as described in ASTM test method B117-61. The prepared samples were subjected to a direct salt water spray. Simultaneously 50 volts DC was applied to adjacent tip and ring terminals. The resistances in ohms initially and after 24 hours are shown in Table III. The control sample receptacle block, a copper alloy contact with tin-lead plate, was uncoated.

TABLE III
INSULATION RESISTANCE IN OHMS
SALT SPRAY DATA

| Sample No. | Initial | 24 hrs. |
|---|---|---|
| 18 | $1.1 \times 10^{11}$ | $7.0 \times 10^7$ |
| 19 | $1.2 \times 10^{11}$ | $2.1 \times 10^3$ |
| 24 | $1.2 \times 10^{11}$ | $3.3 \times 10^3$ |
| 26 | $1.6 \times 10^{12}$ | $8.6 \times 10^6$ |
| 30 | $1.9 \times 10^{11}$ | $4.5 \times 10^3$ |
| Control | $8.0 \times 10^{10}$ | 850 |

The data of Table III show improved life of a termination system in corrosive environments for a terminal treated with a contact enhancing composition of the invention compared to an untreated termination system (control).

EXAMPLE 3

High connection resistance, the resistance between the contact receptacle and the protector pin, is undesirable in sliding connections. Materials, such as some plastics and rubbers, which are good insulators generally prevent or hinder connection resistance. The compositions of the present invention are deformed and displaced by pin insertion, thus allowing electrical contact.

Oxidation at the contact interface leads to high connection resistance. The Thermal Aging test, run essentially as disclosed in "AT&T Business Services Evaluation Criteria Flat Undercarpet Telephone Cable" bulletin, Appendix F, Mar. 10, 1980, was conducted to measure the effect of aging on a connection. Dry heat (118° C.) was used for 34 days, with readings of the contact interface, in milliohms, taken at 2, 8, 16, and 34 days. A termination system coated with the composition of sample 18 of Table I and an uncoated control sample were used, as shown in Table IV.

TABLE IV
THERMAL AGING
CHANGE IN CONNECTION RESISTANCE
DATA IN MILLIOHMS

| Sample No. | 2 | | 8 | | 16 | | 34 | |
|---|---|---|---|---|---|---|---|---|
| | Avg. | High | Avg. | High | Avg. | High | Avg. | High |
| 18 | .128 | .820 | .400 | 1.025 | .626 | 1.614 | 1.062 | 3.467 |
| control | .312 | .832 | .761 | 4.420 | 1.721 | 23.357 | 2.321 | 17.593 |

The data of Table IV show that the composition of sample 18 provided an environmental sealant at the contact interface, thus retarding oxidation, when compared to an untreated contact (control).

EXAMPLE 4

A plug-unplug test of 200 cycles run essentially as described in AT&T Network Department Product Evaluation Report #149, Issue 2, ¶ 2.0104 *Contact Resistance Qualification Test* was performed in an atmosphere of 52° C. and 90–95% relative humidity. In this atmosphere the protectors were cycled plug to unplug five times an hour with 6 minutes plugged in and 6 minutes in the out or detent position. Each trial was conducted for a total of 20 cycles a day for 10 days. After an overnight dry-out the parts were tested for changes in connection resistance. The data is shown in Table V for samples 1-8 and 10-31 of Table I, and an uncoated tin/lead coated contact as a control.

TABLE V

CONTACT RESISTANCE
(PLUG-UNPLUG)
CHANGE IN CONNECTION RESISTANCE
IN MILLIOHMS

| Sample No.* | Overall Average** |
|---|---|
| 1 | 4.5 |
| 2 | 2.7 |
| 3 | 7.4 |
| 4 | 4.3 |
| 5 | 3.1 |
| 6 | 2.9 |
| 7 | 1.9 |
| 8 | 2.8 |
| 10 | 2.1 |
| 11 | 2.6 |
| 12 | 3.2 |
| 13 | 2.6 |
| 14 | 2.3 |
| 15 | 2.2 |
| 16 | 4.6 |
| 17 | 3.1 |
| 18 | .50 |
| 19 | 1.2 |
| 20 | .88 |
| 21 | 1.15 |
| 22 | 1.9 |
| 23 | 2.9 |
| 24 | .96 |
| 25 | 1.0 |
| 26 | .51 |
| 27 | 2.3 |
| 28 | 1.8 |
| 29 | 2.1 |
| 30 | 3.0 |
| 31 | 2.5 |
| Control | 5.2 |

*all samples were coated out to a dry thickness of about 50 microns
**Represents an average of 100 data points for samples 1-8, 200 data points for samples 10-18, 600 data points for the Control, and 400 data points for samples 19-31.

The data of Table V show that the results for samples No. 2, 6, 7, and 10-31, within the invention, were superior to the control in the plug-unplug test. The data also show that various antioxidants in the formulation of the compositions of the present invention contribute to their good performance in this test.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A soft, deformable composition comprising an admixture of:
   a. an effective amount of an anhydride copolymer,
   b. an effective amount of a flexibilizing polymer selected from polyisobutylene, styrene olefin styrene block polymer, and polymers of ethylene copolymerized with vinyl acetate, vinyl acrylate, vinyl methacrylate, and alpha-olefins;
   c. an effective amount of a hydrophobic, compatible, fluoroaliphatic radical-containing composition,
   d. up to 5 weight percent of the composition of a mercaptan compound, and
   e. an effective amount of an antioxidant compound.

2. A composition according to claim 1 wherein:
   a. said anhydride copolymer is present in the range of 8 to 75 weight percent of the dried composition,
   b. said flexibilizing polymer is present in the range of 8 to 75 weight percent of the dried composition,
   c. said fluoroaliphatic radical-containing composition is present in the range of 5 to 75 weight percent of the dried composition,
   d. said mercaptan compound is present in the range of 0 to 7 weight percent of the dried composition, and
   e. said antioxidant compound is present in the range of 1.0 to 20 weight percent of the dried composition.

3. The composition according to claim 1 wherein said anhydride copolymer is derived from an alkyl-, phenyl- or phenylalkyl-substituted or unsubstituted cyclic anhydride in which said alkyl group contains 1 to 6 carbon atoms and said cyclic group contains 4 to 15 carbon atoms.

4. The composition according to claim 1 wherein said anhydride copolymer is selected from maleic anhydride and itaconic anhydride copolymerized with $C_{10}$ to $C_{24}$ aliphatic hydrocarbons.

5. The composition according to claim 4 wherein said anhydride copolymer is selected from maleic anhydride octadecene copolymer, maleic anhydride decene copolymer, and maleic anhydride tetradecene copolymer.

6. The composition according to claim 1 wherein said flexibilizing polymer is selected from polyisobutylene, styrene olefin styrene block polymer, and polymers of ethylene copolymerized with vinyl acetate, vinyl acrylate, vinyl methacrylate, and alpha-olefins.

7. The composition according to claim 1 wherein said fluoroaliphatic radical-containing composition comprises a monovalent, fluorinated, aliphatic organic radical having an average of at least 5 to 14 carbon atoms.

8. The composition according to claim 1 wherein said anhydride copolymer is present in the range of 10 to 67 weight percent.

9. The composition according to claim 1 wherein said flexibilizing polymer is present in the range of 10 to 57 weight percent.

10. The composition according to claim 1 wherein said fluoroaliphatic radical-containing composition is present in the range of 7 to 68 weight percent.

11. The composition according to claim 1 wherein said mercaptan compound is present in the range of 0.05 to 1.0 weight percent.

12. The composition according to claim 1 wherein said antioxidant compound is present in the range of 1.5 to 18 weight percent.

13. The composition according to claim 1 wherein said mercaptan compound is selected from a silane mercaptan having 4 to 17 carbon atoms and an alkyl or alkoxy mercaptan of 4 to 24 carbon atoms.

14. The composition according to claim 13 wherein said silane mercaptan is gamma-mercaptopropyltrimethoxysilane.

15. The composition according to claim 13 wherein said alkyl or alkoxy mercaptan is octadecene mercaptan.

16. A coating solution comprising an admixture of:
   a. 4 to 30 weight percent of the total solution of:
      (1) 8 to 75 weight percent of the dried coating of an anhydride copolymer,
      (2) 8 to 75 weight percent of the dried coating of a flexibilizing polymer selected from polyisobutylene, styrene olefin styrene block polymer, and polymers of ethylene copolymerized with vinyl acetate, vinyl acrylate, vinyl methacrylate, and alpha-olefins;

(3) 5 to 75 weight percent of the dried coating of a hydrophobic, soluble, compatible, fluoroaliphatic radical-containing compound or polymer, (4) 0 to 7 weight percent of the dried coating of a mercaptan compound, (5) 1.0 to 20 weight percent of an antioxidant compound, and b. 96 to 70 weight percent of the total solution of: a solvent system comprising a mixture of at least one $C_6$ to $C_9$ aliphatic hydrocarbon, at least one lower molecular weight $C_1$ to $C_4$ alcohol, and trichlorotrifluoroethane;

said solution being capable of drying to form a soft, deformable coating.

17. The solution according to claim 16 wherein said aliphatic hydrocarbon comprises 5 to 35 percent, said alcohol comprises 0.5 to 25 percent, and said trichlorotrifluoroethane comprises 30 to 90 percent by weight of the solvent mixture.

18. The solution according to claim 16 wherein said aliphatic hydrocarbon in said solvent system is selected from heptane and hexane.

19. The solution according to claim 16 wherein said alcohol in said solvent system is isopropyl alcohol.

20. An article having at least one set of metallic contacts, which contacts are coated on at least one surface thereof with a soft, deformable contact enhancing composition comprising:

a. 8 to 75 weight percent of the dried contact enhancing composition of an anhydride copolymer, b. 8 to 75 weight percent of the dried contact enhancing composition of a flexibilizing polymer selected from polyisobutylene, styrene olefin styrene block polymer, and polymers of ethylene copolymerized with vinyl acetate, vinyl acrylate, vinyl methacrylate, and alpha-olefins;

c. 5 to 75 weight percent of the dried contact enhancing composition of a hydrophobic, compatible, fluoroaliphatic radical-containing compound or polymer, d. 0 to 7 weight percent of the dried contact enhancing composition of a mercaptan compound, e. 1.0 to 20 weight percent of the dried contact enhancing composition of an antioxidant compound.

21. The article according to claim 20 wherein said contacts are provided with said composition by means of spraying, dipping, or brushing.

22. An article according to claim 20 wherein said article is an electrical receptacle block.

23. A soft, deformable composition comprising an admixture of:

a. an effective amount of an anhydride copolymer selected from maleic anhydride and itaconic anhydride copolymerized with a $C_{10}$ to $C_{24}$ aliphatic hydrocarbon, b. an effective amount of a flexibilizing polymer, c. an effective amount of a hydrophobic, compatible, fluoroaliphatic radical-containing composition, d. up to 5 weight percent of the composition of a mercaptan compound, and e. an effective amount of an antioxidant compound.

24. A coating solution comprising an admixture of:

a. 4 to 30 weight percent of the total solution of:

(1) 8 to 75 weight percent of the dried coating of an anhydride copolymer selected from maleic anhydride and itaconic anhydride copolymerized with a $C_{10}$ to $C_{24}$ aliphatic hydrocarbon, (2) 8 to 75 weight percent of the dried coating of a flexibilizing polymer, (3) 5 to 75 weight percent of the dried coating of a hydrophobic, soluble, compatible, fluoroaliphatic radical-containing compound or polymer, (4) 0 to 7 weight percent of the dried coating of a mercaptan compound, (5) 1.0 to 20 weight percent of an antioxidant compound, and b. 96 to 70 weight percent of the total solution of: a solvent system comprising a mixture of at least one $C_6$ to $C_9$ aliphatic hydrocarbon, at least one lower molecular weight $C_1$ to $C_4$ alcohol, and trichlorotrifluoroethane, said solution being capable of drying to form a soft, deformable coating.

25. An article having a least one set of metallic contacts, which contacts are coated on at least one surface thereof with a soft, deformable contact enhancing composition comprising:

a. 8 to 75 weight percent of the dried contact enhancing composition of an anhydride copolymer selected from maleic anhydride or itaconic anhydride copolymerized with a $C_{10}$ to $C_{24}$ aliphatic hydrocarbon, b. 8 to 75 weight percent of the dried contact enhancing composition of a flexibilizing polymer, c. 5 to 75 weight percent of the dried contact enhancing composition of a hydrophobic, compatible, fluoroaliphatic radical-containing compound or polymer, d. 0 to 7 weight percent of the dried contact enhancing composition of a mercaptan compound, e. 1.0 to 20 weight percent of the dried contact enhancing composition of an antidioxidant compound.

* * * * *

UNITED STATES PATENT AND TRADEMARK OFFICE
CERTIFICATE OF CORRECTION

PATENT NO. :    4,415,694
DATED      :    Nov. 15, 1983
INVENTOR(S):    Russell A. Rioko and Richard J. Pokorny It is certified that error appears in the above-identified patent and that said Letters Patent is hereby corrected as shown below:

```
Column 1, line 46 Reads
"gold plates contacts."

It should read
--    gold plated contacts.    --

Column 3, line 27 Reads
"maleic anhydride tetradecene copolymer is present in"

It should read
--   maleic anhydride tetradecene copolymer (PA-14, Gulf
Oil Chemicals Co.). The anhydride copolymer is present
in                                                      --
```

UNITED STATES PATENT AND TRADEMARK OFFICE
CERTIFICATE OF CORRECTION

PATENT NO. : 4,415,694                 Page 2 of 2

DATED      : Nov. 15, 1983

INVENTOR(S) : Russell A. Rioko and richard J. Pokorny

It is certified that error appears in the above-identified patent and that said Letters Patent is hereby corrected as shown below:

```
Column 3, line 63 Reads
"chlorine is present for every wo carbon atoms in the"

It should read
--   chlorine is present for every two carbon atoms in
the                                                   --

Column 6, line 66 Reads
"resistance at contant interfaces. Many samples gave"

It should read
--   resistance at contact interfaces. Many samples
gave                                               --
```

Signed and Sealed this

Fourteenth Day of May 1985

[SEAL]

*Attest:*

DONALD J. QUIGG

*Attesting Officer*      *Acting Commissioner of Patents and Trademarks*

UNITED STATES PATENT AND TRADEMARK OFFICE
CERTIFICATE OF CORRECTION

PATENT NO. : 4,415,694

DATED : November 15, 1983

INVENTOR(S) : Russell A. Roiko and Richard J. Pokorny

It is certified that error appears in the above-identified patent and that said Letters Patent is hereby corrected as shown below:

Col. 4, line 44, replace "octadecene with --octadecyl--.

Claim 1, lines 9 and 10 (Col. 9, lines 59 and 60), replace "vinyl acrylate, vinyl methacrylate" with --acrylate esters, methacrylate esters--.

Claim 6, lines 4 and 5 (Col. 10, line 28 and 29), replace "vinyl acrylate, vinyl methacrylate" with --acrylate esters, methacrylate esters--.

Claim 16, lines 11 and 12 (Col. 10, line 67), replace "vinyl acrylate, vinyl methacrylate" with --acrylate esters, methacrylate esters--.

UNITED STATES PATENT AND TRADEMARK OFFICE
CERTIFICATE OF CORRECTION

PATENT NO. : 4,415,694

DATED : November 15, 1983

INVENTOR(S) : Russell A. Roiko nd Richard J. Pokorny

It is certified that error appears in the above-identified patent and that said Letters Patent is hereby corrected as shown below:

Claim 20, lines 13 and 14 (Col. 11, line 36 and 37), replace "vinyl acrylate, vinyl methacrylate" with --acrylate esters, methacrylate esters--.

Claim 15, line 2 (Col. 10, line 57), replace "octadecene' with --octadecyl--.

Signed and Sealed this

*Seventeenth* Day of *September 1985*

[SEAL]

*Attest:*

*Attesting Officer*

DONALD J. QUIGG

*Commissioner of Patents and Trademarks—Designate*